US009163627B2

(12) United States Patent
Kawase et al.

(10) Patent No.: US 9,163,627 B2
(45) Date of Patent: Oct. 20, 2015

(54) ROTATING PUMP AND BRAKE SYSTEM USING SAME

(71) Applicants: Nippon Soken, Inc., Nishio, Aichi-pref. (JP); DENSO CORPORATION, Kariya, Aichi-pref. (JP); Advics Co., Ltd., Kariya, Aichi-pref. (JP)

(72) Inventors: Yasuhiro Kawase, Nishio (JP); Kazunori Uchiyama, Okazaki (JP); Naoki Hakamada, Anjo (JP); Kazuhide Uchida, Hamamatsu (JP); Takahiro Yamaguchi, Kariya (JP); Tomoaki Kawabata, Takahama (JP)

(73) Assignees: DENSO CORPORATION, Kariya, Aichi-pref. (JP); NIPPON SOKEN, INC., Nishio, Aichi-pref. (JP); ADVICS CO., LTD., Kariya, Aichi-pref. (JP)

( * ) Notice: Subject to any disclaimer, the term of this patent is extended or adjusted under 35 U.S.C. 154(b) by 20 days.

(21) Appl. No.: 14/093,114

(22) Filed: Nov. 29, 2013

(65) Prior Publication Data

US 2014/0152084 A1    Jun. 5, 2014

(30) Foreign Application Priority Data

Nov. 30, 2012 (JP) ................................ 2012-263021

(51) Int. Cl.
| | |
|---|---|
| *B60T 11/10* | (2006.01) |
| *F04C 2/10* | (2006.01) |
| *F04C 15/00* | (2006.01) |
| *B60T 13/14* | (2006.01) |
| *B60T 17/02* | (2006.01) |

(52) U.S. Cl.
CPC ................ *F04C 2/10* (2013.01); *B60T 13/146* (2013.01); *B60T 17/02* (2013.01); *F04C 2/102* (2013.01); *F04C 15/0007* (2013.01); *F04C 15/0026* (2013.01); *F04C 15/0038* (2013.01)

(58) Field of Classification Search
USPC ........... 303/10, 116.4; 417/253, 423.1, 423.3, 417/423.11; 418/15, 19, 61.1–61.3
See application file for complete search history.

(56) References Cited

U.S. PATENT DOCUMENTS

| 6,419,469 | B1 * | 7/2002 | Shulver et al. ................... 418/15 |
|---|---|---|---|
| 2009/0142208 | A1 * | 6/2009 | Rhein et al. ................. 417/410.3 |
| 2011/0116949 | A1 * | 5/2011 | Kawabata .................. 417/410.1 |
| 2011/0217192 | A1 * | 9/2011 | Rosalik, Jr. ................. 417/410.4 |
| 2011/0229361 | A1 * | 9/2011 | Kuroda et al. ................. 418/166 |
| 2015/0037193 | A1 * | 2/2015 | Inoue et al. ................... 418/61.3 |
| 2015/0037194 | A1 * | 2/2015 | Kan et al. .................... 418/206.8 |

FOREIGN PATENT DOCUMENTS

JP    2004-176676    6/2004

* cited by examiner

*Primary Examiner* — Christopher Schwartz
(74) *Attorney, Agent, or Firm* — Harness, Dickey & Pierce, P.L.C.

(57) ABSTRACT

A rotating pump includes an outer rotor and an inner rotor. The inner and outer rotors are rotated by a drive shaft between a first side plate and a second side plate to pump put fluid. The first side plate faces the inner and outer rotors and has a first surface and a second surface. The first surface is inclined to an axial direction of the drive shaft to create a wedge-shaped gap between itself and one of the inner and outer rotor. The second surface extends more parallel to a direction perpendicular to the axis direction of the drive shaft than the first surface does. The geometric configurations of the first and second surfaces serve to minimize the leakage of the brake fluid without sacrificing a reduction in resistance to sliding motion of the inner rotor and the outer rotor on the second side plate.

8 Claims, 6 Drawing Sheets

ROTATING PUMP AND BRAKE SYSTEM USING SAME

CROSS REFERENCE TO RELATED DOCUMENT

The present application claims the benefit of priority of Japanese Patent Application No. 2012-263021 filed on Nov. 30, 2012, the disclosure of which is incorporated herein by reference.

BACKGROUND OF THE INVENTION

1. Technical Field of the Invention

This disclosure relates generally to a rotating internal gear pump, such as a trochoid pump, which works to suck fluid and discharge it and a brake system using such a type of pump.

2. Background Art

Typical rotating internal gear pumps are equipped with an inner rotor with outer teeth, an outer rotor with inner teeth, and a casing including side plates and a center plate. The inner rotor and the outer rotor are disposed inside the casing. The outer teeth of the inner rotor mesh with the inner teeth of the outer rotor to form a plurality of cavities which vary in volume thereof with rotation of the inner and outer rotors to pump out fluid.

The above type of pumps are required to hermetically isolate between a high-pressure region and a low-pressure region within the pumps. Such hermetic isolation is achieved by pressing a sealing member installed in one of the side plates against one of opposed major end surfaces of each of the inner and outer rotors and also pressing the other major end surface of each of the inner and outer rotor directly against the other side plate to create a mechanical seal therebetween. Additionally, a sealing member is mounted in a recess formed in the center plate and urged against an outer circumferential wall of the outer rotor to develop a hermetic seal therebetween.

The mechanical seal between the side plate and each of the outer and inner rotor results in an increase in loss of torque of the outer and inner rotors, which results in production of heat, thus thermally expanding a portion of the pump to deteriorate the performance of the pump.

In order to eliminate the above drawback, Japanese Patent First Publication No. 2004-176676 teaches a rotating pump for an automotive vehicles which has a protrusion formed on a central area of an end surface of the side plate (i.e., a pump cover) which is placed in line contact with each of the inner and outer rotors to create a mechanical seal therebetween, thereby minimizing the amount of heat, as produced by friction between the side plate and each of the inner and outer rotors.

Specifically, a portion of the end surface of the side plate which faces the inner and outer rotors is entirely inclined to form a gap between itself and each of the inner and outer rotors. The brake fluid is accumulated in the gap to reduce friction resistance to sliding motion of each of the inner and outer rotors on the side plate, however, it results in concern about leakage of the brake fluid from a high-pressure region to a low-pressure region in the pump.

SUMMARY OF THE INVENTION

It is therefore an object of this disclosure to provide an improved structure of a rotating pump which is designed to reduce friction resistance to sliding motion of each of an inner and an outer rotor on a side plate and also to minimize the leakage of fluid from a high-pressure region to a low-pressure region in the pump and also provide a brake system using such a type of rotating pump.

According to one aspect of the invention, there is provided a rotating pump which may be employed in a brake system for automotive vehicles. The rotating pump comprises: (a) a rotating assembly which includes an outer rotor with inner teeth and an inner rotor with outer teeth meshing with the inner teeth of the outer rotor, the inner rotor being rotated by a drive shaft to create between the outer and inner teeth a plurality of cavities whose volumes change according to rotation of the inner rotor to pump out fluid, each of the rotating assembly, the outer rotor, and the inner rotor having a first and a second end surface opposed to each other in an axial direction of the drive shaft; (b) a casing in which the rotating assembly is disposed, the casing including a first side plate, a second side plate, and a center plate which is so disposed between the first and second side plates as to surround an outer periphery of the outer rotor, the first side plate facing the first end surface of the rotating assembly, the second side plate facing the second end surface of the rotating assembly and being disposed substantially in contact with at least a portion of the second end surface of each of the outer rotor and the inner rotor through a mechanical seal; (c) an inlet port which is formed in the casing and through which the fluid is sucked into the rotating assembly; (d) an outlet port which is formed in the casing and through which the fluid is pumped out of the rotating assembly; (e) a sealing unit which hermetically isolates a low-pressure region and a high-pressure region from each other, the low-pressure region being a region where pressure of the fluid is in a lower level between the first side plate and the rotating assembly, the high-pressure region being a region where the pressure of the fluid is in a higher level between the first side plate and the rotating assembly; (f) a first surface which is formed on at least one of the first end surface of the second side plate and the second end surface of one of the outer and inner rotors, the first surface being inclined at a first angle to a center axis of the drive shaft to create a gap between the first end surface of the second side plate and the second end surface of the one of the outer and inner rotors, the gap being so formed as to have between the first end surface of the second side plate and the second end surface of the one of the outer and inner rotors in the axial direction of the drive shaft an interval which increases in a direction away from the drive shaft; and (g) a second surface which is formed on at least one of the first end surface of the second side plate and the second end surface of one of the outer and inner rotors. The second surface is inclined at a second angle to the center axis of the drive shaft. The second surface extends more parallel to a direction perpendicular to the center axis of the drive shaft than the first surface does, so that the second angle is smaller than the first angle.

Specifically, the first surface is, as described above, inclined to the center axis of the drive shaft to create the gap between the first end surface of the second side plate and the second end surface of the one of the outer and inner rotors. The fluid is accumulated in the gap to make a layer of the fluid which reduces the resistance to sliding motion of the inner and outer rotor on the second side plate. The second surface creates a second gap between the first end surface of the second side plate and the second end surface of the one of the outer and inner rotors. The second gap may be almost zero. The volume of the fluid accumulated in the gap is smaller than that in the gap, as defined by the first surface, thereby resulting in an increase in resistance to flow of the fluid between the first end surface of the second side plate and the second end surface of the inner rotor or the outer rotor, which minimizes the leakage of the fluid from a high-pressure region to a low-pressure region between the first end surface of the second side plate and the second end surface of the inner rotor or the outer rotor within the pump without sacrificing the reduction in resistance to sliding motion of the inner and outer rotor on the second side plate.

According to another aspect of the embodiment, there is provided a brake system for a vehicle which comprises: (a) a hydraulic brake pressure generator which works to produce pressure of brake fluid in response to a braking request; (b) a brake force generator which works to apply a brake force, as produced in response to the pressure of the brake fluid, to a wheel of the vehicle; (c) a main hydraulic line which is connected to the hydraulic brake pressure generator to transmit the pressure of the brake fluid to the brake force generator; (d) an auxiliary hydraulic line which is connected to the hydraulic brake pressure generator to supply the brake fluid to the main hydraulic line to enhance the brake force, as produced by the brake force generator; and (e) a rotating pump which is equipped with an inlet port into which the brake fluid is sucked from the hydraulic brake pressure generator through the auxiliary hydraulic line and an outlet port from which the brake fluid is pumped out to the brake force generator through the main hydraulic line. The rotating pump includes: (1) a rotating assembly which includes an outer rotor with inner teeth and an inner rotor with outer teeth meshing with the inner teeth of the outer rotor, the inner rotor being rotated by a drive shaft to create between the outer and inner teeth a plurality of cavities whose volumes change according to rotation of the inner rotor to pump out fluid, each of the rotating assembly, the outer rotor, and the inner rotor having a first and a second end surface opposed to each other in an axial direction of the drive shaft; (2) a casing in which the rotating assembly is disposed, the casing including a first side plate, a second side plate, and a center plate which is so disposed between the first and second side plates as to surround an outer periphery of the outer rotor, the first side plate facing the first end surface of the rotating assembly, the second side plate facing the second end surface of the rotating assembly and being disposed substantially in contact with at least a portion of the second end surface of each of the outer rotor and the inner rotor through a mechanical seal; (3) the inlet port which is formed in the casing and through which the fluid is sucked into the rotating assembly; (4) the outlet port which is formed in the casing and through which the fluid is pumped out of the rotating assembly; (5) a sealing unit which hermetically isolates a low-pressure region and a high-pressure region from each other, the low-pressure region being a region where pressure of the fluid is at a lower level between the first side plate and the rotating assembly, the high-pressure region being a region where the pressure of the fluid is in a higher level between the first side plate and the rotating assembly; (6) a first surface which is formed on at least one of the first end surface of the second side plate and the second end surface of one of the outer and inner rotors, the first surface being inclined at a first angle to a center axis of the drive shaft to create a gap between the first end surface of the second side plate and the second end surface of the one of the outer and inner rotors, the gap being so formed as to have between the first end surface of the second side plate and the second end surface of the one of the outer and inner rotors in the axial direction of the drive shaft an interval which increases in a direction away from the drive shaft; and (7) a second surface which is formed on at least one of the first end surface of the second side plate and the second end surface of one of the outer and inner rotors. The second surface is inclined at a second angle to the center axis of the drive shaft. The second surface extends more parallel to a direction perpendicular to the center axis of the drive shaft than the first surface does, so that the second angle is smaller than the first angle. This structure offers substantially the same advantages, as described above.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
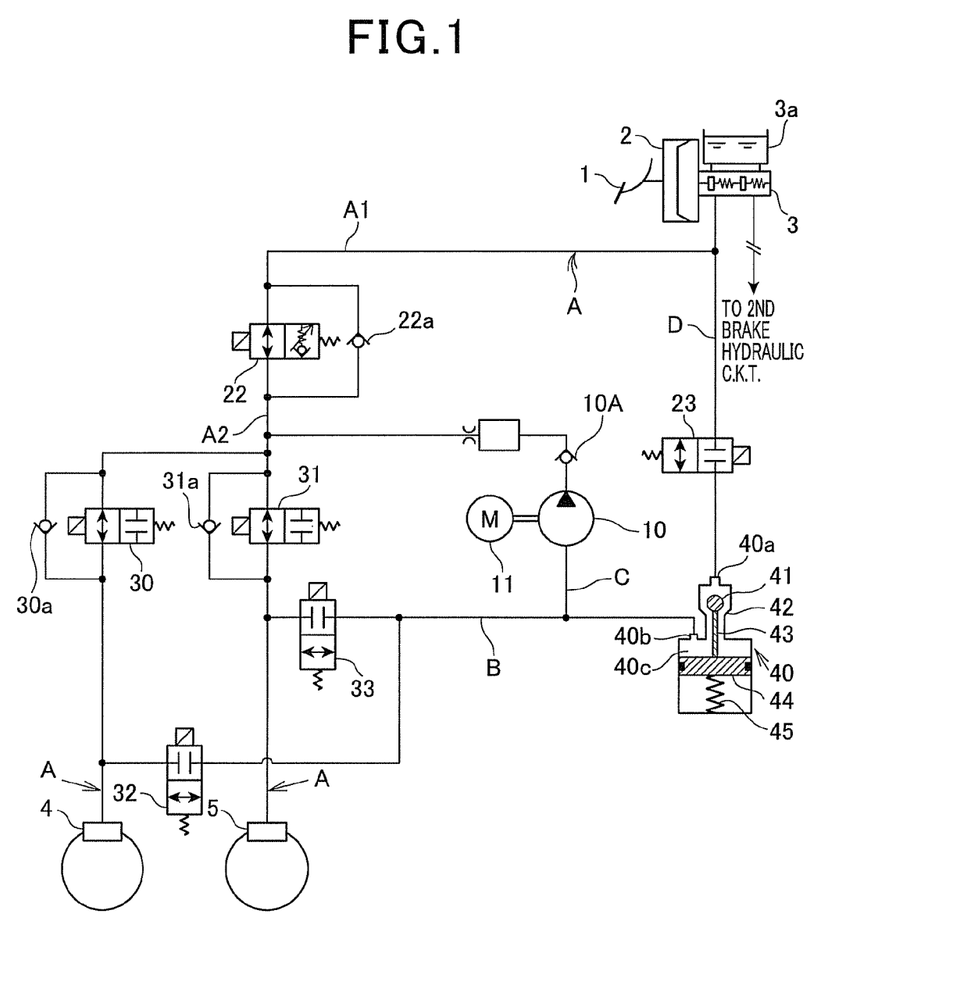
FIG. 1 is a circuit diagram which illustrates a brake system equipped with a rotating pump according to the first embodiment of the invention.

Referring to the drawings, wherein like reference numbers refer to like parts in several views, particularly to FIG. 1, there is shown a brake system equipped with a rotating pump 10 according to the first embodiment of the invention. The brake system, as referred to herein, is used with an automotive vehicle equipped with a so-called diagonal split system which includes two brake hydraulic circuits one of which controls the right front and the left rear wheel and the other of which controls the left front and the right rear wheel, but may be used with a front/rear split system.

The brake system includes a brake pedal 1 (i.e., a brake actuating member) to be depressed by a vehicle occupant or driver for applying the brakes to the vehicle. The brake pedal 1 is connected to a brake booster (also called a vacuum servo or servo unit) 2 which works to boost the pressure applied to a brake pedal 1. The brake booster 2 is equipped with a pushrod which transmits the pressure, as enhanced by the brake booster 2, to a master cylinder (M/C) 3. The pushrod serves to push pistons installed in the master cylinder 3 to create a hydraulic pressure (which will also be referred to as a master cylinder pressure below). The master cylinder pressure is transmitted through a brake pressure control actuator working in an ABS (Antilock Brake System) mode to wheel cylinders 4 and 5 for the right front and left rear wheels, respectively. The master cylinder 3 is also connected to a master reservoir 3a. The mater reservoir 3a supplies the brake fluid to the master cylinder 3 or stores an excess of the brake fluid in the master cylinder 3.

The brake pedal 1, the brake booster 2, and the master cylinder 3 work as a hydraulic brake pressure generator. The wheel cylinders 4 and 5 work as a brake force generator.

For the brevity of illustration, FIG. 1 shows only one of two brake hydraulic circuits of the diagonal split system which leads to the right front wheel cylinder 4 and the left rear wheel cylinder 5, but however, the brake system of this embodiment is, as described above, also equipped with the second brake hydraulic circuit which leads to left front and right rear wheel cylinders. The second brake hydraulic circuit is identical in structure and operation with the first brake hydraulic circuit, as illustrated in FIG. 1, and explanation thereof in detail will be omitted here.

The brake system also includes a main hydraulic line A connected to the master cylinder 3. The main hydraulic line A has disposed therein a check valve 22a and a differential pressure control valve 22 which is controlled in operation thereof by a brake electronic control unit (ECU) for the brake system and from which two branch lines: a branch line A1 and a branch line A2 extend. Specifically, the main hydraulic line A is made up of two sections: a hydraulic line A1 and a hydraulic line A2. The hydraulic line A1 extends from the master cylinder 3 to the differential pressure control valve 22 and is subjected to the master cylinder pressure. The hydraulic line A2 extends from the differential pressure control valve 22 to the wheel cylinders 4 and 5.

The differential pressure control valve 22 is operable in either of two modes: an open mode and a pressure-difference mode. Usually, the differential pressure control valve 22 is in the open mode. When the master cylinder pressure is lower than a given level, and the pressure is required to be applied to the wheel cylinders 4 and 5 to brake the wheels suddenly or when a traction control mode is entered, the differential pressure control valve 22 is placed in the pressure difference mode and works to develop a difference in pressure between the master cylinder 3 and the wheel cylinders 4 and 5. The differential pressure control valve 22 is capable of linearly altering the level to which the pressure difference is set.

The hydraulic line A2 is also made up of two sections: one of which leads to the wheel cylinder 4 and has disposed therein a pressure-increasing valve 30 which controls the increasing of pressure of the brake fluid to be delivered to the wheel cylinder 4 and other of which leads to the wheel cylinder 5 and has installed therein a pressure-increasing valve 31 which controls the increasing of pressure of the brake fluid to be delivered to the wheel cylinder 5.

Each of the pressure-increasing valves 30 and 31 is implemented by a two-position valve which is opened or closed by the brake ECU in a brake fluid pressure control mode. When opened, the pressure-increasing valves 30 and 31 deliver the master cylinder pressure or a hydraulic brake pressure, as produced by the pump 10 which will be described later in detail, to the wheel cylinders 4 and 5, respectively. Each of the pressure-increasing valves 30 and 31 is normally kept open when the brake system is not in the brake fluid pressure control mode (e.g., an antilock braking mode which will also be referred to as an ABS control mode). Such a mode will also be referred to as a normal braking mode below.

The pressure-increasing valves 30 and 31 have relief valves 30a and 31a disposed in parallel thereto. The relief valves 30a and 31a work to relieve the brake fluid from the wheel cylinders 4 and 5 when the brake pedal 1 is released to terminate the ABS control mode.

The brake system also includes hydraulic lines B leading to the branch lines A2 between the pressure-increasing valve 30 and the wheel cylinder 4 and between the pressure-increasing valve 31 and the wheel cylinder 5, respectively. The hydraulic lines B also connect with a pressure control reservoir 40.

The hydraulic lines B have installed therein pressure-reducing valves 32 and 33, respectively, which are opened or closed by the brake ECU. Each of the pressure-reducing valves 32 and 33 is normally kept closed when the brake system is in the normal braking mode (i.e., not in the ABS control mode).

The brake system also includes hydraulic lines C and D serving as auxiliary hydraulic lines. The hydraulic line C connects at an end thereof to a joint between the differential pressure control valve 22 and a joint between the pressure-increasing valves 30 and 31 and also at the other end to the pressure control reservoir 40 (i.e., a portion of the hydraulic line B leading to the pressure control reservoir 40). The rotating pump 10 is disposed in the hydraulic line C. The rotating pump 10 has a relief valve 10A disposed in an outlet thereof to avoid a back flow of the brake fluid to the rotating pump 10. The rotating pump 10 is also connected to an electric motor 11 which works as a drive source to rotate the pump 10.

The hydraulic line D connects between the pressure control reservoir 40 and the master cylinder 3. A two-position valve 23 is disposed in the hydraulic line D. The two-position valve 23 is of a normally closed type and opened in a brake assist control mode or a traction control mode. When the two-position valve 23 is actuated to open the hydraulic line D, the differential pressure control valve 22 keeps a difference in pressure between the master cylinder 3 and the wheel cylinders 4 and 5, and the pump 10 is actuated. The pump 10 then sucks the brake fluid from the hydraulic line A1 through the hydraulic line D and discharges it to the hydraulic line A2, thereby elevating the pressure in the wheel cylinders 4 and 5 more than that in the master cylinder 3 to enhance the braking force acting on the wheels.

The pressure control reservoir 40 works to regulate a difference between the pressure of brake fluid in the pressure control reservoir 40 and the master cylinder pressure and supply the brake fluid to the pump 10. The pressure control reservoir 40 includes reservoir ports 40a and 40b and a reservoir chamber 40c leading to the reservoir ports 40a and 40b. The reservoir port 40a connects with the hydraulic line D and receives the brake fluid, as transmitted from the master cylinder 3. The reservoir port 40b connects with the hydraulic lines B and C and receives the brake fluid drained from the wheel cylinders 4 and 5. The reservoir port 40b also works to deliver the brake fluid to an inlet of the pump 10.

The pressure control reservoir 40 also has a valve member 41 such as a ball. When the valve member 41 rests on or leave a valve seat 42 to block or establish hydraulic communication between the hydraulic line D and the reservoir chamber 40c.

The gap or distance between the valve member 41 and the valve seat 42 is regulated to control a difference between the master cylinder pressure and the pressure in the reservoir chamber 40c. The pressure control reservoir 40 also has a rod 43 separate from the valve member 41. The rod 43 is disposed beneath the valve member 41 to be movable to lift up or down the valve member 41. The pressure control reservoir 40 also includes a piston 44 and a spring 45. The piston 44 is movable vertically to move the rod 43. The spring 45 works to urge the piston 44 upward toward the valve member 41 so as to discharge the brake fluid from the reservoir chamber 40c.

When a given volume of the brake fluid is stored in the pressure control reservoir 40, the valve member 41 rests on the valve seat 42 to block the flow of brake fluid into the reservoir chamber 40c, thereby preventing the volume of the brake fluid which exceeds the sucking capacity of the pump 10. This avoids the application of a undesirable high pressure level of the brake fluid to the inlet of the pump 10.

The structure of the rotating pump 10 will be described below in detail with reference to FIGS. 2(a) to 2(d).

The pump 10 is an internal gear trochoid pump and includes a casing 50 and a rotating assembly made up of an outer rotor 51 and an inner rotor 52. The outer rotor 51 and the inner rotor 52 are disposed inside a rotor chamber 50a of the casing 50. The outer rotor 51 and the inner rotor 52 have center axes X and Y, respectively, which are located eccentrically with each other. The outer rotor 51 has inner teeth 51a formed on an inner periphery thereof. The inner rotor 52 has outer teeth 52a formed on an outer periphery thereof. The inner teeth 51a of the outer rotor 51, as clearly illustrated in FIG. 2(a), mesh with the outer teeth 52a of the inner rotor 52 so as to create a plurality of gaps therebetween. The rotating pump 10 is, as can be seen from FIG. 2(a), of a multi-teeth trochoid pump with no crescent. The inner rotor 52 and the outer rotor 51 mesh with each other at a plurality of points of contact therebetween in order to transmit torque of the inner rotor 52 to the outer rotor 51.

Figure 2A:
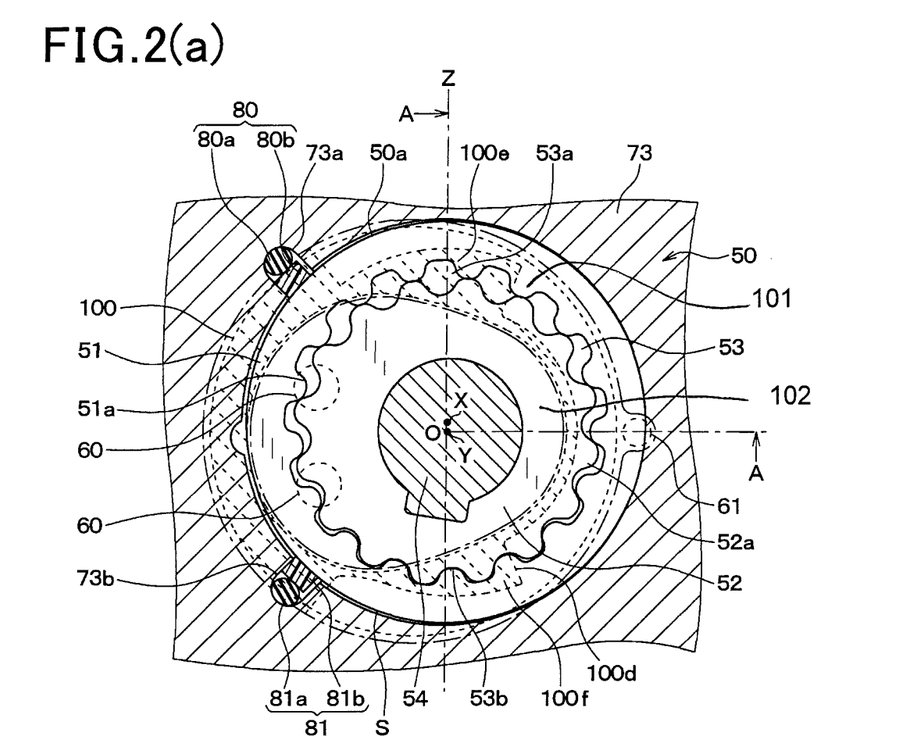
FIG. 2(a) is a traverse sectional view, as taken along the ling B-B in FIG. 2(b), which illustrates the rotating pump in FIG. 1.
Figure 2B:
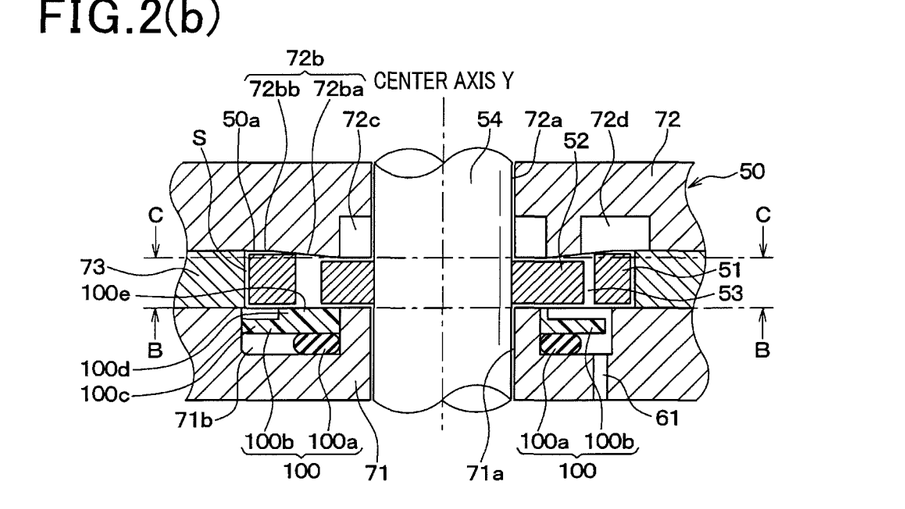
FIG. 2(b) is a vertical sectional view, as taken long the line A-O-A in FIG. 2(a)

The casing 50 is, as clearly illustrated in FIG. 2(b), made up of first and second side plates 71 and 72 and a center plate 73. The rotor chamber 50a is defined or surrounded by the first and second side plates 71 and 72 and the center plate 73. The outer and inner rotors 51 and 52 are disposed between the first and second side plates 71 and 72. The center plate 73 is interposed between the first and second side plates 71 and 72 and has formed therein a hole in which the outer rotor 51 and the inner rotor 52 are disposed. The center plate 73 surrounds the periphery of the outer rotor 51 through a small gap S. Specifically, the small gap S is formed between the inner periphery of the center plate 72 and the outer periphery of the outer rotor 51. The brake fluid flows into the gap S.

The first and second side plates 71 and 72, as illustrated in FIG. 2(b), have formed therein center holes 71a and 72a, respectively, which communicate with the rotor chamber 50a. The center holes 71a and 72a are aligned with each other to define a chamber through which a drive shaft 54 fit in the inner rotor 52 passes. The outer rotor 51 and the inner rotor 52 are disposed in the hole of the center plate 73 to be rotatable. Specifically, a rotating mechanism made up of the outer rotor 51 and the inner rotor 52 is mounted inside the rotor chamber 50a of the casing 50 to be rotatable. The outer rotor 51, as clearly illustrated in FIG. 2(a), rotates about the axis X. The inner rotor 52 rotates about the axis Y.

If a line passing through or traversing the axes X and Y of the outer rotor 51 and the inner rotor 52 on a plane extending perpendicular to the axes X and Y is defined as a center line Z of the pump 10, the first side plate 71 has inlet ports 60 and an outlet port 61 formed on both sides of the center line Z. Specifically, the inlet ports 60 are located on the left side of the center line Z, as viewed in FIG. 2(a), while the outlet port 61 is located on the right side of the center line Z. The inlet ports 60 and the outlet port 61 communicate with the rotor chamber 50a and a plurality of gaps or cavities 53 between the inner periphery of the outer rotor 51 and the outer periphery of the inner rotor 52. The brake fluid which has entered the inlet ports 60 is sucked into the cavities 53 and then pumped out of the outlet port 61.

An enclosed cavity 53a that is one of the cavities 53 which is the greatest in volume does not communicate with any of the inlet ports 60 and the outlet port 61. Similarly, an enclosed cavity 53b that is one of the cavities 53 which is the smallest in volume does not communicate with any of the inlet ports 60 and the outlet port 61. The enclosed cavities 53a and 53b serve to keep or hold a difference in pressure between the inlet ports 60 and the outlet port 61.

The center plate 73 has formed in the inner periphery thereof recesses 73a and 73b which are located about 45 degrees away from the center line Z toward the inlet port 60 in circumferential opposite directions of the outer rotor 51 where the axis X of the outer rotor 51 is defined as an origin on a plan extending perpendicular to the axis X. In other words, an angle which a line passing through each of the recesses 73a and 73b and the axis X makes with the center line Z on the plan extending perpendicular to the axis X is 45 degrees. Sealing units 80 and 81 are disposed inside the recesses 73a and 73b to minimize the flow of the brake fluid on the outer circumference of the outer rotor 51. Specifically, the sealing units 80 and 81 work to hermetically seal or isolate a region along the outer circumference of the outer rotor 51 where the pressure of the brake fluid is higher in level from a region along the outer circumference of the outer rotor 51 where the pressure of the brake fluid is lower in level.

The sealing unit 80 is made up of a rubber member 80a which is spherical or substantially cylindrical and a resin member 80b which is cuboid. The resin member 80b is pressed by the rubber member 80a into constant contact with the outer rotor 51 to hermetically seal the outer periphery of the outer rotor 51. The rubber member 80a has elasticity to absorb a production error in the size of the outer rotor 51, thereby ensuring the stability in hermetically sealing the outer periphery of the outer rotor 51.

The resin member 80b has a width, as defined in a direction of rotation of the outer rotor 51, which is great enough to create a small gap between the inner wall of the recess 73a and the resin member 80b. This is because when the width of the resin member 80b is identical with that of the recess 73a, it may result in a failure of the resin member 80b to re-expand to make a sealing contact with the outer surface of the outer rotor 51 once the resin member 80b is compressed by the pressure of the brake fluid toward the bottom of the recess 73a (i.e., in a radially outward direction, as viewed in FIG. 2(a)). In order to alleviate the above problem, the width of the resin member 80b is so selected as to develop the small gap between the inner wall of the recess 73a and the resin member 80b, thereby facilitating the ease with which the resin member 80b re-expands to make the sealing contact with the outer surface of the outer rotor 51 in response to the pressure of the brake fluid after being compressed deep into the recess 73a. The sealing unit 81 made up of the rubber member 81a and the resin member 80b has the same structure as that of the sealing unit 80, and explanation thereof in detail will be omitted here.

The first side plate 71, as illustrated in FIG. 2(b), has a sealing groove 71b formed therein. The sealing groove 71b is, as clearly illustrated in FIG. 2(a) of an annular shape and has a varying width, as indicated by two dashed circular lines in FIG. 2(a) (i.e., an outermost and an innermost one of broken lines in FIG. 2(a)). Specifically, the sealing groove 71b surrounds the drive shaft 54 and has sections whose widths variably increases. The sealing groove 71b communicates with the outlet port 61. The sealing groove 71b has the center which is located eccentrically from the axis of rotation of the drive shaft 54 toward the inlet ports 60 (i.e. the left-hand direction, as viewed in the drawing). Specifically, the sealing groove 71b extends substantially between the outlet port 61 and the drive shaft 54 and passes through the enclosed cavities 53a and 53b and portions of the outer rotor 51 sealed by the sealing units 80 and 81.

A sealing unit 100 is disposed in the sealing groove 71b. The sealing unit 100 is, as can be seen in FIG. 2(b), made up of an elastic member 100a made of, for example, rubber and a resin member 100b. The elastic member 100a elastically presses the resin member 100b against the outer rotor 51 and the inner rotor 52.

The resin member 100b has substantially the same configuration as that of the sealing groove 71b and is of an angular shape. The resin member 100b has a step. Specifically, the resin member 100b has a recess 100c formed in a first surface that is one of opposed major surfaces thereof and a protrusion 100d formed on the first surface. The resin member 100b is placed in the sealing groove 71b with the first surface facing an upper opening of the sealing groove 71b, as viewed in FIG. 2(b), so that the protrusion 100d is, as can be seen in FIGS. 2(a) and 2(b), in contact abutment with the surfaces of the outer rotor 51, the inner rotor 52, and the center plate 73. The elastic member 100a is disposed beneath the resin member 100b, that is, on the bottom of the sealing groove 71b. The elastic member 100a elastically presses the resin member 100b upward, as viewed in FIG. 2(b), with aid of the pressure of the brake fluid entering the sealing groove 71b to create a hermetical seal among the outer rotor 51, the inner rotor 52, and the center plate 73.

The protrusion 100d of the sealing unit 100 is of an enclosed annular shape and has a varying width, as hatched by broken lines in FIG. 2(a). The protrusion 100d has a hermetically sealing portions 100e and 100f. The hermetically sealing portion 100e has a width which is great enough to close the whole of the enclosed cavity 53a and hermetically cover around the enclosed cavity 53a. Similarly, the hermetically sealing portion 100f has a width which is great enough to close the whole of the enclosed cavity 53b and hermetically cover around the enclosed cavity 53b.

Specifically, the sealing unit 100 works to hermetically isolate a region 101 of a gap among the major surfaces of the outer rotor 51 and the inner rotor 52 and the first side plate 71 in which the pressure of the brake fluid is higher in level from a region 102 of the gap in which the pressure of the brake fluid is lower in level. Specifically, the sealing unit 100 hermetically isolates a portion of the above gap which is exposed to the outlet port 61 where the pressure of the brake fluid is higher in level from a portion of the above gap which is exposed to the inlet ports 60 around the drive shaft 54.

The second side plate 72 has an end surface 72b that is one of the major end surfaces thereof opposed to each other in the axial direction of the drive shaft 54 (i.e., the thickness-wise direction of the second side plate 72) and faces the rotor chamber 50a. The end surface 72b is placed in direct or indirect contact with at least a portion of the end surface of each of the outer rotor 51 and the inner rotor 52 which faces the second side plate 72, thereby creating mechanical seals among them which hermetically isolate a region of a gap between the second side plate 72 and each of the end surfaces of the outer rotor 51 and the inner rotor 52 in which the pressure of the brake fluid is higher in level from a region of the gap in which the pressure of the brake fluid is lower in level. Specifically, the mechanical seals hermetically isolate a portion of the above gap which is exposed to the outlet port 61 where the pressure of the brake fluid is higher in level from a portion of the above gap which is exposed to the inlet ports 60 around the drive shaft 54.

The mechanical seals are developed by the sealing unit 100 disposed in the first side plate 71 which presses the outer rotor 51 and the inner rotor 52 tightly against the second side plate 72. The resin member 100b of the sealing unit 100 is pressed by the elastic force, as produced by the elastic member 100a, and the pressure of the brake fluid flowing into the sealing groove 71b, so that the outer rotor 51 and the inner rotor 52 are urged by a high hydraulic pressure against the second side plate 72. This will result in an increase in friction resistance occurring among the outer rotor 51, the inner rotor 52, and the second side plate 72 to relative rotation thereof, which leads to an increase in loss of torque of the inner rotor 52.

Figure 2C:
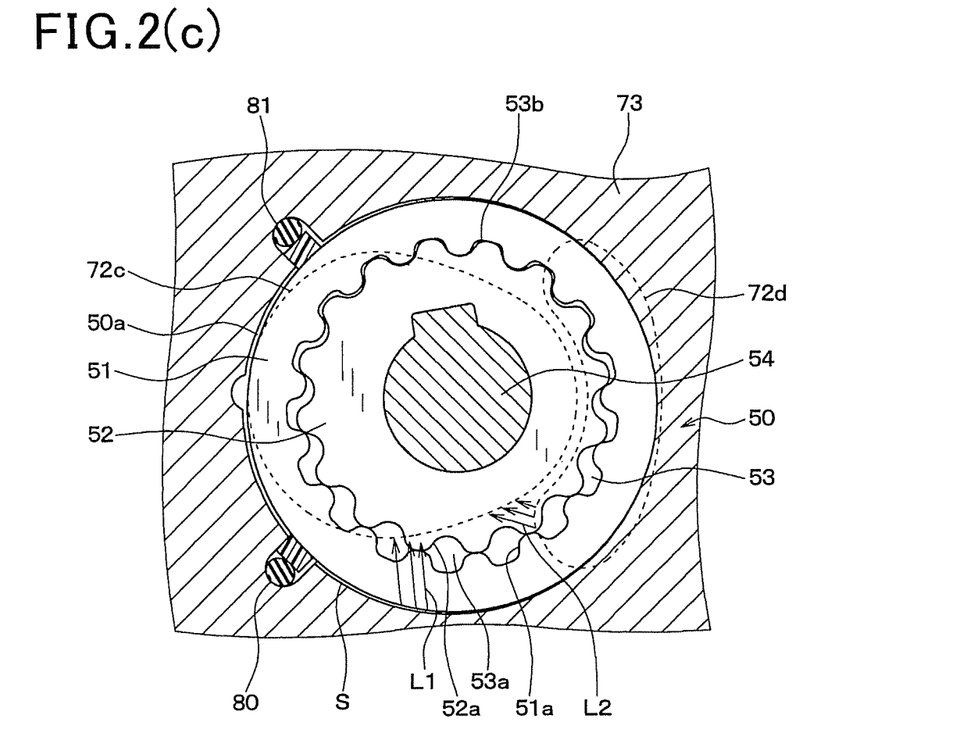
FIG. 2(c) is a traverse sectional view, as taken along the line C-C in FIG. 2(b)

In order to alleviate the above drawback, the second side plate 72 which creates the mechanical seal between itself and each of the outer rotor 51 and the inner rotor 52 is designed, as illustrated in FIGS. 2(b) and 2(c), to have formed therein an inlet groove 72c to which the inlet ports 60 are exposed and an outlet groove 72d to which the outlet port 61 is exposed. The inlet groove 72c and the outlet groove 72d are filled with the brake fluid from the inlet ports 60 and the outlet port 61, thereby causing the pressure of the brake fluid in the inlet groove 72c and the outlet groove 72d to press the outer rotor 51 and the inner rotor 52 away from the second side plate 72. This results in a reduction in pressure level of the brake fluid urging the outer rotor 51 and the inner rotor 52 against the second side plate 72, thereby decreasing the above described friction resistance to the relative rotation of the outer rotor 51, the inner rotor 52, and the second side plate 72, which reduces the drag of rotation of the inner rotor 52.

Figure 2D:
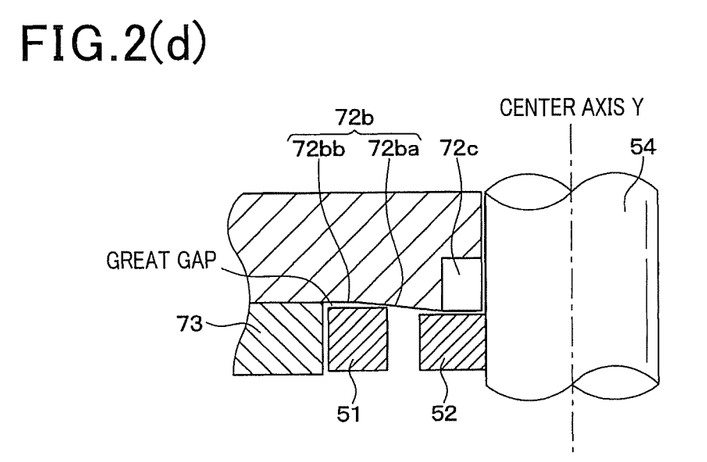
FIG. 2(d) is a partially enlarged vertical view which shows a configuration of an end surface of a second side plate in FIG. 2(b)

In order to further decrease the friction resistance, the end surface 72b of the second side plate 72, as illustrated in FIG. 2(d), has a slant surface 72ba (which will also be referred to as a first surface below) formed on a central portion thereof around the drive shaft 54. The slant surface 72ba is defined by the width of the second side plate 72 which increases toward the drive shaft 54 and is so inclined as to approach the inner rotor 52 (i.e., in a widthwise direction of the second side plate 72), thereby creating a wedge-shaped gap between the end surface 72b and each of the end surfaces of the outer rotor 51 and the inner rotor 52. Each of the gaps is so shaped that an interval between the end surface 72b and a corresponding one of the outer rotor 51 and the inner rotor 52 in the axial direction of the drive shaft 54 (i.e., the thickness-wise direction of the second side plate 72) increases in the outward direction of the second side plate 72. The gaps create layers of the brake fluid (i.e., oil films) therein, thereby further decreasing the above described friction resistance to the relative rotation of the outer rotor 51, the inner rotor 52, and the second side plate 72, which reduces the drag of rotation of the inner rotor 52.

Figure 3:
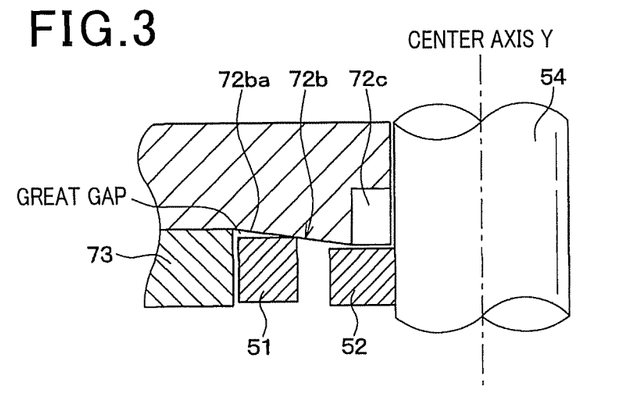
FIG. 3 is a partially enlarged vertical view which shows a comparative example of a second side plate of a rotating pump.

If the whole of a portion of the end surface 72b of the second side plate 72 which is exposed to the rotor chamber 50a (i.e., the outer rotor 51 and the inner rotor 52) is, as demonstrated in FIG. 3, inclined at a given angle to the center axis (i.e., the longitudinal center line) Y of the drive shaft 54 to make the slant surface 72ba, it will result in an increase in volume of the gap between the slant surface 72ba and each of the outer rotor 51 and the inner rotor 52, which leads to an increase in volume of the brake fluid accumulated in the gap.

This results in a decrease in resistance to flow of the brake fluid between the second side plate 72 and each of the outer rotor 51 and the inner rotor 52, that is, facilitates the ease with which the brake fluid flows through the gap, thus leading to leakage of the brake fluid from the high-pressure region to the low-pressure region in the pump 10. Specifically, the slant surface 72ba of FIG. 3 may result in leakage of the brake fluid, as indicated by arrows L2 in FIG. 2(c), from the outer periphery of the outer rotor 51 toward the inlet groove 72c.

In order to eliminate the above leakage, the end surface 72d of the second side plate 72 is, as illustrated in FIG. 2(b), shaped to have a horizontal surface 72bb (which will also be referred to as a second surface below) which extends from the slant surface 72ba outward in the radius direction of the outer and inner rotors 51 and 52 (i.e., the drive shaft 54). In this embodiment, the horizontal surface 72bb extends in parallel to the major end surface of the second side plate 72 (i.e., in a direction perpendicular to the center axis Y of the drive shaft 54), but however, may be inclined slightly relative to the center axis Y so as to create a small gap between itself and the end surface of the outer rotor 51. In other words, the horizontal surface 72bb extends more parallel to the direction perpendicular to the center axis Y of the drive shaft 54 than the slant surface 72ba does. The boundary between the first surface 72ba and the second surface 72bb is located in a portion of the end surface 72b which faces the end surface of the outer rotor 51 in the axial direction of the drive shaft 54 so that a gap which is of a wedge-shape in a vertical section thereof is created between the end surface of the outer rotor 51 and the horizontal surface 72bb (i.e., the second surface).

The formation of the second surface 7bb, thus, results in a decrease in the gap between the end surface 72b of the second side plate 72 and the outer rotor 51, thereby decreasing the volume of the brake fluid accumulated in the gap as compared with the structure of FIG. 3. This enables the resistance to the flow of the brake fluid between the second side plate 72 and the outer rotor 51 to be set to a value suitable for minimizing the leakage of the brake fluid from the high-pressure region to the low-pressure region in the pump 10, as described above.

If the end surface 72b of the second side plate 72 which creates the mechanical seal between itself and each of the outer rotor 51 and the inner rotor 52 is entirely made flat, it will result in an increase in resistance to the sliding motion of the outer rotor 51 and the inner rotor 52 on the end surface 72b, which leads to an increase in loss of torque thereof. If the end surface 72b is made flat and has a flatness of a few tens of micrometer, the end surface 72b will have a small undulation. The brake fluid, thus, enters troughs of the undulation, which reduces the resistance to the sliding motion of the outer rotor 51 and the inner rotor 52, but that is not enough. Accordingly, the end surface 72b of this embodiment is shaped to be inclined to put more brake fluid between the end surface 72b and each of the outer rotor 51 and the inner rotor 52 for reducing such sliding resistance. Too much of the brake fluid between the end surface 72b and each of the outer rotor 51 and the inner rotor 52 will, however, result in concern about the leakage of the brake fluid. In order to alleviate this drawback, the end surface 72b (i.e., a portion of one of the major surfaces of the second side plate 72 which is exposed to the rotor chamber 50a) is shaped to have two sections which are inclined at different angles to the center axis Y of the drive shaft 54 (i.e., the center axis of the inner rotor 52). Specifically, the end surface 72b has the first surface 72ba and the second surface 72bb. The second surface 72bb extends substantially parallel to the radius direction of the inner rotor 52 (i.e., the drive shaft 54), but may be inclined at an angle (other than 0°) to the radius direction of the inner rotor 52 which is smaller than that at which the first surface 72ba is inclined to the radius direction of the inner rotor 52. This geometry of the end surface 72b serves to minimize the leakage of the brake fluid as well as the reduction in resistance to the sliding motion of the outer rotor 51 and the inner rotor 52.

The operation of the pump 10 will be described below.

When it is required to create the pressure in the wheel cylinders 4 and 5 which is higher in level than the pressure in the master cylinder 3, as produced by driver's depression of the brake pedal 1, for example, in the brake assist mode, the brake ECU opens the two-position valve 23 and actuates the differential pressure control valve 22 to hold a difference in pressure between the master cylinder 3 and the wheel cylinders 4 and 5.

The brake ECU also actuates the electric motor 11 to drive the pump 10 to suck or discharge the brake fluid. Specifically, when the electric motor 11 is turned on, the drive shaft 54 is rotated to rotate the inner rotor 52. This causes the outer rotor 51 to rotate in the same direction as the inner rotor 52 through engagement of the inner teeth 51a with the outer teeth 52a. Each of the cavities 53, then, changes in volume thereof cyclically every one rotation of the outer rotor 51 and the inner rotor 52, thereby sucking the brake fluid from the inlet ports 60 and at the same time discharging the brake fluid from the outlet port 61 to the hydraulic line A2 to elevate the pressure in the wheel cylinders 4 and 5. Specifically, the pump 10 performs a pumping operation to rotate the inner rotor 51 and the outer rotor 52 to suck the brake fluid from the inlet ports 60 and discharge it from the outlet port 61.

In the pumping operation, the differential pressure control valve 22, as described above, works to keep the difference in pressure between the master cylinder 3 and the wheel cylinders 4 and 5 at a given level, thus causing the discharge pressure of the pump 10 to be exerted on the pressure downstream from the differential pressure control valve 22, that is, the pressure in the wheel cylinders 4 and 5, so that the pressure which is higher in level than the master cylinder pressure will arise in the wheel cylinders 4 and 5.

During the pumping operation, a portion of the outer periphery of the outer rotor 51 which is exposed to the inlet ports 60 is subjected to the pressure of the brake fluid sucked into the pressure control reservoir 40 (i.e., the atmospheric pressure), while a portion of the outer periphery of the outer rotor 51 which is exposed to the outlet port 61 is exerted by the higher pressure (i.e., the discharge pressure of the pump 10). This causes the periphery of the outer rotor 51 to have a high-pressure portion and a low-pressure portion. The sealing units 80 and 81, as described above, serve to hermetically isolate the high-pressure portion and the low-pressure portion from each other, thereby minimizing the leakage of the brake fluid from the high-pressure portion to the low-pressure portion. The low-pressure portion of the outer periphery of the outer rotor 51 is kept at the same pressure as in some of the cavities 53 leading to the inlet ports 60, while the high-pressure portion of the outer periphery of the outer rotor 51 is kept at the same pressure as in some of the cavities 53 leading to the outlet ports 60, thus keeping a balance in pressure between outside and inside the outer rotor 51, which ensures the stability in operation of the pump 10.

The pump 10 has the sealing units 80 and 81 located closer to the inlet ports 60 than to the outlet port 61, so that an area of the outer periphery of the outer rotor 51 surrounding outside the enclosed cavities 53a and 53b is subjected to the discharge pressure of the pump 10. This causes the outer rotor 51 to be compressed inwardly in a vertical direction, as viewed in FIG. 2(a), so that clearances between tops of the inner teeth 51a of the outer rotor 51 and tops of the outer teeth 52a of the inner rotor 52 which are located next to the enclosed cavity 53a will be decreased, thereby decreasing the leakage of the brake fluid therefrom.

Additionally, the gap among the major end surfaces (i.e., axially-opposed surfaces) of the outer rotor 51 and the inner rotor 52 and each of the first side plate 71 and the second side plate 72, as described above, has the low-pressure region exposed to the inlet ports 60 around the drive shaft 54 and the high-pressure region exposed to the outlet port 61. The sealing unit 100 and the mechanical seals serve to hermetically isolate the high-pressure region and the low-pressure region from each other to minimize the leakage of the brake fluid from the high-pressure region to the low-pressure region. The sealing unit 100 and the mechanical seals are in contact with the sealing units 80 and 81, thus avoiding the leakage of the brake fluid from clearances among them.

The end surface 72b of the second side plate 72 which creates the mechanical seals, as described above, includes the first surface 72ba which is inclined to the center axis Y of the drive shaft 54 and the second surface 72bb which extends substantially parallel to the radius direction of the second side plate 72 (i.e., the drive shaft 54), thus resulting in a decrease in resistance to the sliding motion of the outer rotor 51 and the inner rotor 52 on the second side plate 72 without sacrificing the prevention of leakage of the brake fluid from the high-pressure region to the low-pressure region in the pump 10.

Figure 4:
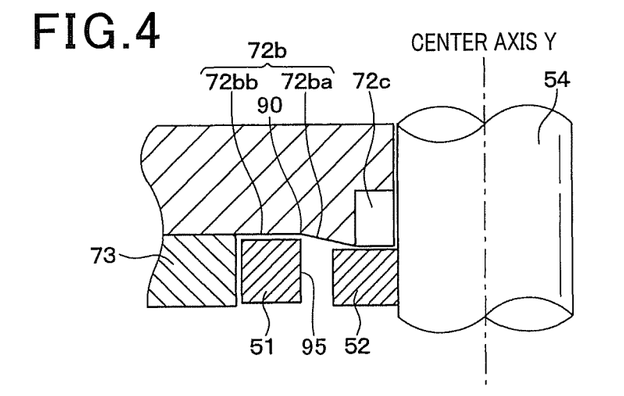
FIG. 4 is a partially enlarged vertical view which shows a configuration of an end surface of a second side plate according to the second embodiment.

FIG. 4 illustrates the second side plate 72 of the pump 10 according to the second embodiment of the invention. The same reference numbers as employed in the first embodiment will refer to the same parts, and explanation thereof in detail will be omitted here.

The end surface 72b of the second side plate 72 is, like in the first embodiment, designed to have the first surface 72ba and the second surface 72bb, but the boundary 90 therebetween is located in the radius direction of the outer rotor 51 (i.e., the radius direction of the drive shaft 54) inside a line 95 along which the tops of the inner teeth 51a of the outer rotor 51 travel. The second surface 72bb extends substantially perpendicular to the center axis Y of the drive shaft 54, so that it is in contact with the end surface of the outer rotor 51.

The above geometric configuration of the end surface 72b offers the same advantages as in the first embodiment, but however, the clearance between the second surface 72bb and the outer rotor 51 is almost zero. The brake fluid, thus, hardly enters the clearance between the second surface 72bb and the outer rotor 51, so that the resistance to the sliding motion of the outer rotor 51 on the second side plate 72 will be greater than that in the first embodiment, however, it enhances the effect of reducing the leakage of the brake fluid from the high-pressure region to the low-pressure region in the pump 10 as compared with the first embodiment. The layer of the brake fluid created between the first surface 72b and the inner rotor 52 ensures, like in the first embodiment, the reduction in resistance to the sliding motion of the inner rotor 52 on the second side plate 72.

Figure 5:
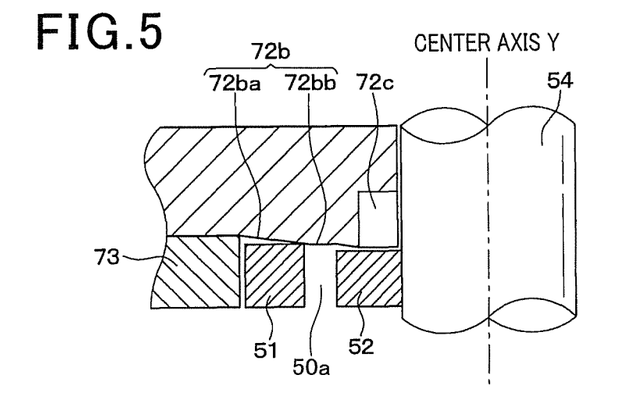
FIG. 5 is a partially enlarged vertical view which shows a configuration of an end surface of a second side plate according to the third embodiment.

FIG. 5 illustrates the second side plate 72 of the pump 10 according to the third embodiment of the invention. The same reference numbers as employed in the first embodiment will refer to the same parts, and explanation thereof in detail will be omitted here.

The end surface 72b of the second side plate 72 has the first surface 72ba and the second surface 72bb. The first surface 72ba is greater in width than that of the above embodiment and extends inwardly from the outer edge of a portion of the end surface 72b which is exposed to the rotor chamber 50a. The second surface 72bb is formed on a portion of the first surface 72ba which is exposed to the inner rotor 52. In other words, the first surface 72ba is inclined at an angle other than 90° to the center axis Y of the inner rotor 52 (i.e., the drive shaft 54) and has an annular area (i.e., the second surface 72bb) extending substantially parallel to the radius direction of the inner rotor 52 so as to create, as clearly illustrated in FIG. 5, wedge-shaped gaps between the end surface 72b and the outer rotor 51 and between the end surface 72b and the inner rotor 52.

The volume of the gap between the end surface 72b and the outer rotor 51 is substantially the same as in FIG. 3, but however, the volume of the gap between the end surface 72b and the inner rotor 52 will be smaller than that in the second embodiment of FIG. 4, thus decreasing the leakage of the brake fluid from the high-pressure region to the low-pressure region in the pump 10. For example, if an entire area of the end surface 72b exposed to the end surface of the inner rotor 52 is inclined as the first surface 72ba, the leakage of the brake fluid occurs, as indicated by the arrows L2 in FIG. 2(c), from the outlet groove 72d to the inlet groove 72c, however, such leakage is reduced by the geometrical configuration of the end surface 72d of this embodiment.

Figure 6:
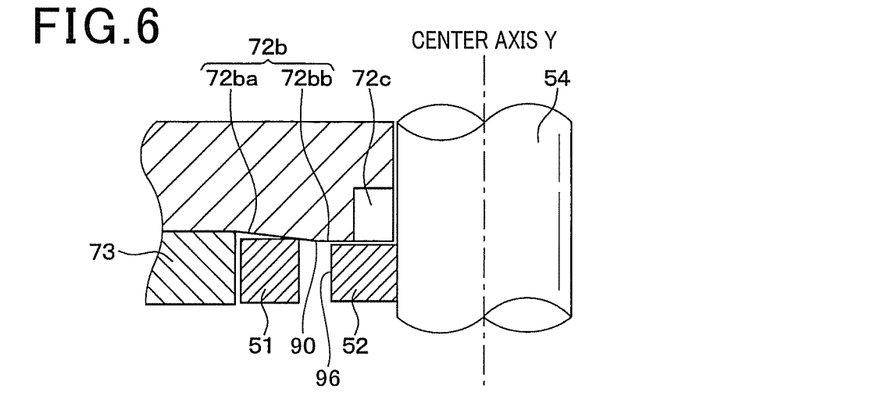
FIG. 6 is a partially enlarged vertical view which shows a configuration of an end surface of a second side plate according to the fourth embodiment.

FIG. 6 illustrates the second side plate 72 of the pump 10 according to the fourth embodiment of the invention. The same reference numbers as employed in the first embodiment will refer to the same parts, and explanation thereof in detail will be omitted here.

The second side plate 72 of this embodiment is different from the third embodiment in an area of the end surface 72d where the second surface 72bb is formed. Other arrangements are identical with those in the second embodiment.

The second surface 72bb is formed at least all or part of an area of the end surface 72b which is exposed to or faces the end surface of the inner rotor 52 in the thickness-wise direction of the second side plate 72. The second surface 72bb extends substantially perpendicular to the center axis Y of the drive shaft 54. The boundary between the first surface 72ba and the second surface 72bb is located in the radius direction of the outer rotor 51 (i.e., the radius direction of the drive shaft 54) outside a line 96 along which the tops of the outer teeth 52a of the inner rotor 52 travel. The second surface 72bb extends substantially perpendicular to the center axis Y of the drive shaft 54, so that it is in contact with the end surface of the inner rotor 52.

The geometric configuration of the end surface 72b of this embodiment reduces the volume of a clearance between the second surface 72bb and the inner rotor 52 to almost zero. The brake fluid, however, enters the clearance between the first surface 72ba and the outer rotor 51 to develop a layer of the brake fluid therebetween, thus decreasing the resistance to the sliding motion of the outer rotor 51 on the second side plate 72 although such an effect is smaller than that in the first embodiment. The reduction in volume of the clearance between the second surface 72bb and the inner rotor 52 enhances the effect of reducing the leakage of the brake fluid from the high-pressure region to the low-pressure region in the pump 10 as compared with the first embodiment.

Figure 7:
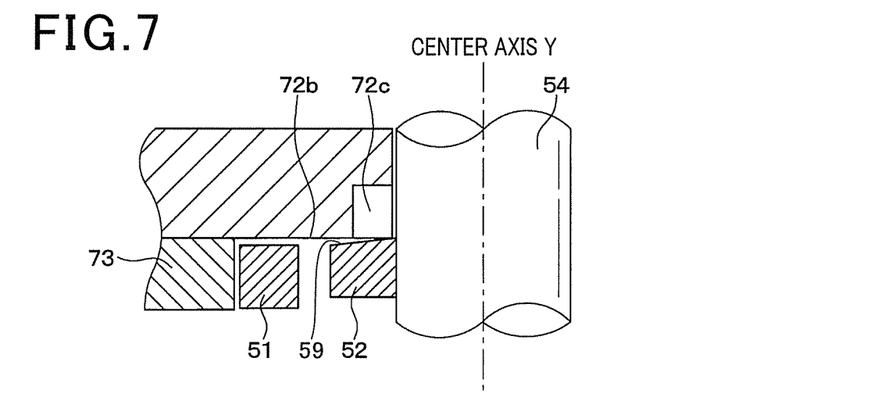
FIG. 7 is a partially enlarged vertical view which shows a configuration of an end surface of a second side plate according to the fifth embodiment.

FIG. 7 illustrates the second side plate 72 of the pump 10 according to the fifth embodiment of the invention which is different from the first embodiment in that the end surface 72b is not partially inclined to the center axis Y of the drive shaft 54, but the end surface of the inner rotor 52 facing the second side plate 72 is inclined. The same reference numbers as employed in the first embodiment will refer to the same parts, and explanation thereof in detail will be omitted here.

The end surface 72b is shaped to be flat and extend substantially perpendicular to the center axis Y of the drive shaft 54. The end surface 59 of the inner rotor 52 which faces the end surface 72b is inclined at a given angle other than 90° to the center axis Y so that the interval between the end surface 72b and the end surface of the inner rotor 52 increases outwardly from the drive shaft 54. In other words, the end surface 59 serves as the first surface 72ba. The end surface of the outer rotor 51 which faces the end surface 72b is flat and extends perpendicular to the center axis Y, so that it is in contact with the end surface 72b.

The above geometric configurations of the end surface 72b and the inner rotor 52 offer the same advantages as in the first embodiment, but however, the clearance between the outer rotor 51 and the end surface 72b is almost zero. The brake fluid, thus, hardly enters the clearance between the outer rotor 51 and the second surface 72bb, so that the resistance to the sliding motion of the outer rotor 51 on the second side plate 72 will be greater than that in the first embodiment, however, it enhances the effect of reducing the leakage of the brake fluid from the high-pressure region to the low-pressure region in the pump 10 as compared with the first embodiment.

Figure 8:
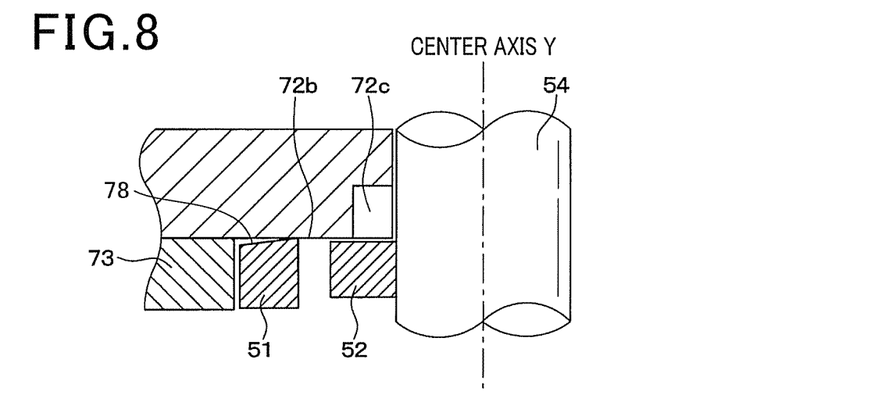
FIG. 8 is a partially enlarged vertical view which shows a configuration of an end surface of a second side plate according to the sixth embodiment.

FIG. 8 illustrates the second side plate 72 of the pump 10 according to the sixth embodiment of the invention which is different from the first embodiment in that the end surface 72b is not partially inclined to the center axis Y of the drive shaft 54, but the end surface of the outer rotor 51 facing the second side plate 72 is inclined. The same reference numbers as employed in the first embodiment will refer to the same parts, and explanation thereof in detail will be omitted here.

The end surface 72b is shaped to be flat and extend substantially perpendicular to the center axis Y of the drive shaft 54. The end surface 78 of the outer rotor 51 which faces the end surface 72b is inclined at a given angle other than 90° to the center axis Y so that the interval between the end surface 72b and the end surface of the outer rotor 5 increases outwardly in a direction away from the drive shaft 54. In other words, the end surface 78 serves as the first surface 72ba. The end surface of the inner rotor 52 which faces the end surface 72b is flat and extends perpendicular to the center axis Y, so that it is in contact with the end surface 72b.

The above geometric configurations of the end surface 72b and the outer rotor 51 offer the same advantages as in the first embodiment, but however, the clearance between the inner rotor 52 and the end surface 72b is almost zero. The brake fluid, thus, hardly enters the clearance between the inner rotor 52 and the second surface 72bb, so that the resistance to the sliding motion of the inner rotor 52 on the second side plate 72 will be greater than that in the first embodiment, however, it enhances the effect of reducing the leakage of the brake fluid from the high-pressure region to the low-pressure region in the pump 10 as compared with the first embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

Figure 9:
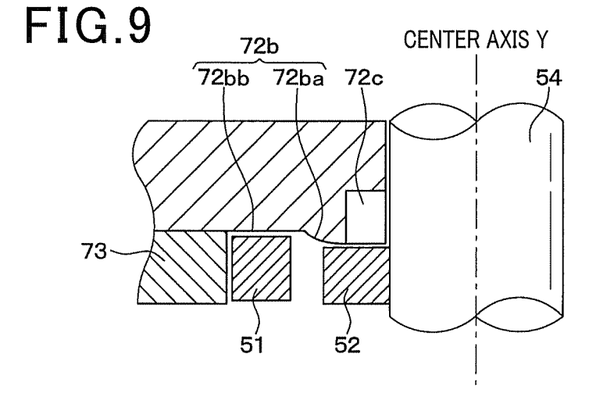
FIG. 9 is a partially enlarged vertical view which shows a first modification of an end surface of a second side plate.

For instance, the end surface 72b of the second side plate 72 in the first to fourth embodiments has the first surface 72ba inclined at a constant angle to the center axis of the inner rotor 52, however, the first surface 72ba may be, as illustrated in FIG. 9, curved or rounded. In such a configuration, the angle which a tangential line of the first surface 72ba makes with the center axis Y gradually increases or decreases. The angle which the second surface 72bb makes with the center axis Y is closer to 90° than the angle which the tangential line of the first surface 72ba at the boundary between itself and the second surface 72bb makes with the center axis Y This results in a decrease in volume of the clearance between the end surface 72b and each of the outer rotor 51 and the inner rotor 52 as compared with the case where the whole of the end surface 72b is formed as the first surface 72ba, thus reducing the leakage of the brake fluid from the high-pressure region to the low-pressure region in the pump 10.

Figure 10:
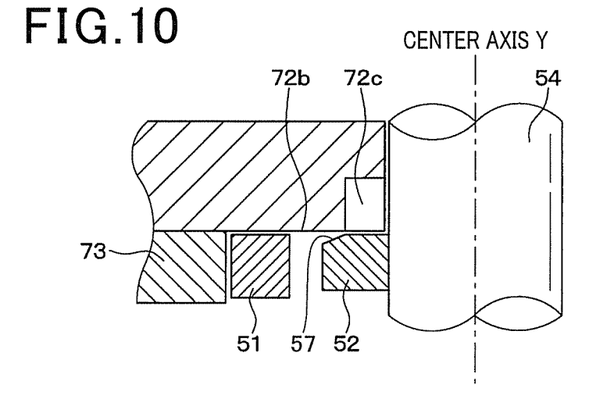
FIG. 10 is a partially enlarged vertical view which shows a second modification of an end surface of a second side plate.
Figure 11:
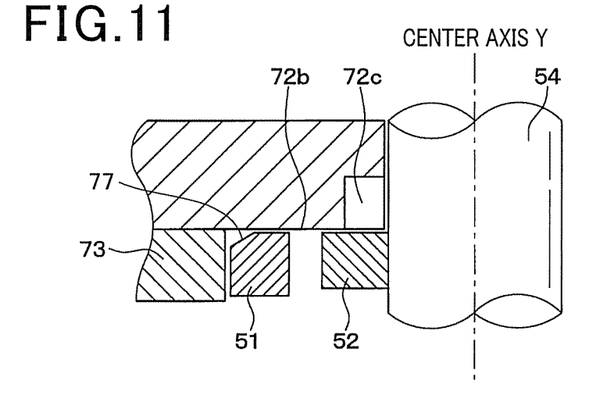
FIG. 11 is a partially enlarged vertical view which shows a third modification of an end surface of a second side plate.

In the fifth or sixth embodiment, the inner rotor 52 or the outer rotor 51 has one of the axially-opposed end surfaces entirely inclined, but may be shaped, as illustrated in FIG. 10 or 11, to have the end surface partially inclined at a given angle to the center axis Y. Specifically, the end surface of the inner rotor 52 or the outer rotor 51 has two annular areas: one being closer to the drive shaft 54 in the radius direction of the inner rotor 52 or the outer rotor 51 and extending substantially perpendicular to the center axis Y, and the other being farther away from the drive shaft 54 and inclined at a given angle other than 90° to the center axis Y. In other words, the inclined surface 57 in FIG. 10 serves as the first surface 72ba. Similarly, the inclined surface 77 in FIG. 11 serves as the first surface 72ba.

As apparent from the above discussion, the rotating pump 10 includes the rotating assembly which includes the outer rotor 51 with the inner teeth 51a and the inner rotor 52 with the outer teeth 52a meshing with the inner teeth 51a of the outer rotor 51, the casing 50, the inlet ports 60, the outlet port 61, the sealing unit 100, the first surface 72ba, and the second surface 72bb. The inner rotor 52 is rotated by the drive shaft 54 to create between the outer teeth 52a and the inner teeth 51a the cavities 53 whose volumes change according to rotation of the inner rotor 52 to pump out the brake fluid. Each of the rotating assembly, the outer rotor 51, and the inner rotor 52 has a first and a second end surface opposed to each other in the axial direction (i.e., the lengthwise direction) of the drive shaft 54. The casing 50 has the rotating assembly disposed therein. The casing 50 includes the first side plate 71, the second side plate 72, and the center plate 73 which is so disposed between the first and second side plates 71 and 72 as to surround the outer periphery of the outer rotor 51. The second end surface of the first side plate 71 faces the first end surface of the rotating assembly. The first end surface of the second side plate faces the second end surface of the rotating assembly and is disposed substantially in contact with at least a portion of the second end surface of each of the outer rotor 51 and the inner rotor 52 through a mechanical seal. The inlet ports 60 are formed in the casing 50 and through which the brake fluid is sucked into the rotating assembly. The outlet port 61 is formed in the casing 50 and through which the brake fluid is pumped out of the rotating assembly. The sealing unit 100 hermetically isolates a low-pressure region and a high-pressure region from each other. The low-pressure region is a region where pressure of the fluid is in a lower level between the first side plate and the rotating assembly. The high-pressure region is a region where the pressure of the fluid is in a higher level between the first side plate and the rotating assembly. The first surface 72ba is formed on at least one of the first end surface of the second side plate 72 and the second end surface of one of the outer rotor 51 and the inner rotor 52. The first surface 72ba is inclined at a first angle to the center axis Y of the drive shaft 54 to create a gap between the first end surface of the second side plate 72 and the second end surface of the one of the outer rotor 51 and the inner rotor 52. The gap is so formed as to have between the first end surface of the second side plate 72 and the second end surface of the one of the outer rotor 51 and the inner rotor 52 in the axial direction of the drive shaft 54 an interval which increases in a direction away from the drive shaft 54. The second surface 72*bb* is formed on at least one of the first end surface of the second side plate 72 and the second end surface of one of the outer rotor 51 and the inner rotor 52. The second surface 72*bb* is inclined at a second angle to the center axis Y of the drive shaft 54. The second surface 72*bb* extends more parallel to a direction perpendicular to the center axis Y of the drive shaft 54 than the first surface 72*ba* does, so that the second angle is smaller than the first angle. The geometric configurations of the first and second surfaces 72*ba* and 72*bb*, as described above, serve to minimize the leakage of the brake fluid from the high-pressure region to the low-pressure region between the first end surface of the second side plate 72 and the second end surface of the inner rotor 52 or the outer rotor 51 within the pump 10 without sacrificing the reduction in resistance to sliding motion of the inner rotor 52 and the outer rotor 51 on the second side plate 72.

In each of the above embodiments, the casing 50 includes the first side plate 71, but however, the pump 10 may be designed to have all parts thereof disposed in a housing of a brake fluid pressure control actuator and also have the first side plate 71 made by a portion of the housing.

What is claimed is:

1. A rotating pump comprising:
    a rotating assembly which includes an outer rotor with inner teeth and an inner rotor with outer teeth meshing with the inner teeth of the outer rotor, the inner rotor being rotated by a drive shaft to create between the outer and inner teeth a plurality of cavities whose volumes change according to rotation of the inner rotor to pump out fluid, each of the rotating assembly, the outer rotor, and the inner rotor having a first and a second end surface opposed to each other in an axial direction of the drive shaft;
    a casing in which the rotating assembly is disposed, the casing including a first side plate, a second side plate, and a center plate which is so disposed between the first and second side plates as to surround an outer periphery of the outer rotor, the first side plate facing the first end surface of the rotating assembly, the second side plate facing the second end surface of the rotating assembly and being disposed substantially in contact with at least a portion of the second end surface of each of the outer rotor and the inner rotor through a mechanical seal;
    an inlet port which is formed in the casing and through which the fluid is sucked into the rotating assembly;
    an outlet port which is formed in the casing and through which the fluid is pumped out of the rotating assembly;
    a sealing unit which hermetically isolates a low-pressure region in fluid communication with the inlet port and a high-pressure region in fluid communication with the outlet port from each other, the low-pressure region being a region where pressure of the fluid is in a lower level between the first side plate and the rotating assembly, the high-pressure region being a region where the pressure of the fluid is in a higher level between the first side plate and the rotating assembly;
    a first surface which is formed on at least one of the first end surface of the second side plate and the second end surface of one of the outer and inner rotors, the first surface being inclined at a first angle to a center axis of the drive shaft to create a gap between the first end surface of the second side plate and the second end surface of the one of the outer and inner rotors, the gap being so formed as to have between the first end surface of the second side plate and the second end surface of the one of the outer and inner rotors in the axial direction of the drive shaft an interval which increases in a direction away from the drive shaft; and
    a second surface which is formed on at least one of the first end surface of the second side plate and the second end surface of one of the outer and inner rotors, the second surface being inclined at a second angle to the center axis of the drive shaft, the second surface extending more parallel to a direction perpendicular to the center axis of the drive shaft than the first surface does, so that the second angle is smaller than the first angle.

2. A rotating pump as set forth in claim 1, wherein the first end surface of the second side plate is shaped to have the first and second surfaces.

3. A rotating pump as set forth in claim 2, wherein the second surface is located more outward in a radius direction of the drive shaft than the first surface is, wherein a boundary between the first and second surfaces is located inside a portion of the first end surface of the second side plate which faces the second end surface of the outer rotor, and wherein a gap is created between the second surface and the second end surface of the outer rotor.

4. A rotating pump as set forth in claim 2, wherein the second surface is located more outward in a radius direction of the drive shaft than the first surface is, wherein a boundary between the first and second surfaces is located in the radius direction of the drive shaft inside a line along which tops of the inner teeth of the outer rotor travels, and wherein the second surface is placed in contact with the second end surface of the outer rotor.

5. A rotating pump as set forth in claim 2, wherein the second surface is located more inward in a radius direction of the drive shaft than the first surface is, and wherein a boundary between the first and second surfaces is located inside a portion of the first end surface of the second side plate which faces the second end surface of the inner rotor.

6. A rotating pump as set forth in claim 1, wherein the second end surface of the inner rotor has the first surface inclined to the center axis of the drive shaft, and wherein the second end surface of the outer rotor has the second surface extending more parallel to the direction perpendicular to the center axis of the drive shaft than the first surface does.

7. A rotating pump as set forth in claim 1, wherein the second end surface of the outer rotor has the first surface inclined to the center axis of the drive shaft, and wherein the second end surface of the inner rotor has the second surface extending more parallel to the direction perpendicular to the center axis of the drive shaft than the first surface does.

8. A brake system for a vehicle comprising:
    a hydraulic brake pressure generator which works to produce pressure of brake fluid in response to a braking request;
    a brake force generator which works to apply a brake force, as produced in response to the pressure of the brake fluid, to a wheel of the vehicle;
    a main hydraulic line which is connected to the hydraulic brake pressure generator to transmit the pressure of the brake fluid to the brake force generator;
    an auxiliary hydraulic line which is connected to the hydraulic brake pressure generator to supply the brake fluid to the main hydraulic line to enhance the brake force, as produced by the brake force generator; and
    a rotating pump which is equipped with an inlet port into which the brake fluid is sucked from the hydraulic brake pressure generator through the auxiliary hydraulic line and an outlet port from which the brake fluid is pumped out to the brake force generator through the main hydraulic line, the rotating pump including:

a rotating assembly which includes an outer rotor with inner teeth and an inner rotor with outer teeth meshing with the inner teeth of the outer rotor, the inner rotor being rotated by a drive shaft to create between the outer and inner teeth a plurality of cavities whose volumes change according to rotation of the inner rotor to pump out fluid, each of the rotating assembly, the outer rotor, and the inner rotor having a first and a second end surface opposed to each other in an axial direction of the drive shaft;

a casing in which the rotating assembly is disposed, the casing including a first side plate, a second side plate, and a center plate which is so disposed between the first and second side plates as to surround an outer periphery of the outer rotor, the first side plate facing the first end surface of the rotating assembly, the second side plate facing the second end surface of the rotating assembly and being disposed substantially in contact with at least a portion of the second end surface of each of the outer rotor and the inner rotor through a mechanical seal;

the inlet port which is formed in the casing and through which the fluid is sucked into the rotating assembly;

the outlet port which is formed in the casing and through which the fluid is pumped out of the rotating assembly;

a sealing unit which hermetically isolates a low-pressure region in fluid communication with the inlet port and a high-pressure region in fluid communication with the outlet port from each other, the low-pressure region being a region where pressure of the fluid is in a lower level between the first side plate and the rotating assembly, the high-pressure region being a region where the pressure of the fluid is in a higher level between the first side plate and the rotating assembly;

a first surface which is formed on at least one of the first end surface of the second side plate and the second end surface of one of the outer and inner rotors, the first surface being inclined at a first angle to a center axis of the drive shaft to create a gap between the first end surface of the second side plate and the second end surface of the one of the outer and inner rotors, the gap being so formed as to have between the first end surface of the second side plate and the second end surface of the one of the outer and inner rotors in the axial direction of the drive shaft an interval which increases in a direction away from the drive shaft; and a second surface which is formed on at least one of the first end surface of the second side plate and the second end surface of one of the outer and inner rotors, the second surface being inclined at a second angle to the center axis of the drive shaft, the second surface extending more parallel to a direction perpendicular to the center axis of the drive shaft than the first surface does, so that the second angle is smaller than the first angle.

* * * * *